United States Patent [19]

Ando et al.

[11] 3,997,625

[45] Dec. 14, 1976

[54] HOT MELT ADHESIVE FOR METALS

[75] Inventors: Ken Ando, Nara; Yuichi Harada; Yoshinobu Ohya, both of Amagasaki, all of Japan

[73] Assignee: Daicel, Ltd., Osaka, Japan

[22] Filed: Sept. 8, 1975

[21] Appl. No.: 611,208

Related U.S. Application Data

[63] Continuation of Ser. No. 472,594, May 23, 1974, abandoned.

[30] Foreign Application Priority Data

May 30, 1973  Japan .............................. 48-60659

[52] U.S. Cl. ...................... 260/857 L; 260/857 UN
[51] Int. Cl.² ......................................... C08L 77/02
[58] Field of Search ................. 260/857 L, 857 UN

[56] References Cited

UNITED STATES PATENTS

| | | | |
|---|---|---|---|
| 3,516,961 | 6/1970 | Robb | 260/857 L |
| 3,539,662 | 11/1970 | Hill | 260/857 L |
| 3,548,028 | 12/1970 | Itabashi | 260/857 L |
| 3,626,026 | 12/1971 | Fukumura | 260/857 L |
| 3,646,154 | 2/1972 | Marans | 260/857 UN |

FOREIGN PATENTS OR APPLICATIONS

| | | | |
|---|---|---|---|
| 83,463 | 7/1971 | Germany | 260/857 UN |

*Primary Examiner*—Carman J. Seccuro
*Attorney, Agent, or Firm*—Woodhams, Blanchard and Flynn

[57] ABSTRACT

A thermoplastic hot melt adhesive composition for bonding metals which comprises a homogeneous mixture of (A) 60 to 90 percent by weight of a nylon material selected from the group consisting of homopolymers and copolymers of nylon monomer selected from the group consisting of nylon salts having at least 10 carbon atoms, nylon-forming ω-amino acids and nylon-forming lactams, and (B) 10 to 40 percent by weight of an ethylene/vinyl acetate copolymer containing 1 to 25 weight percent of vinyl acetate.

2 Claims, No Drawings

HOT MELT ADHESIVE FOR METALS

This is a continuation of application Ser. No. 472,594, filed May 23, 1974 now abandoned.

BACKGROUND OF THE INVENTION

1. Field of the Invention

This invention relates to a thermoplastic hot melt adhesive for bonding metals. According to the present invention, a hot melt adhesive for metals is provided which exhibits an excellent adhesive strength at a low temperature and in a short period of time after application, and which has a longlasting quality.

2. Description of the Prior Art

As thermoplastic hot melt adhesives in the form of films, there have been known polyethylene, ionomers, ethylene/vinyl acetate copolymer, polyamides (nylons), etc.

However, when polyethylene, ionomer or ethylene/vinyl acetate copolymer has been used for effecting the adhesion of metals, a sufficient adhesive strength has not been obtained and the durability of the adhesive bond has been unsatisfactory. Thus, it has been difficult to make practical use of such adhesives for metals. Further, polyamides (nylons) are known to be effective adhesives for metals. However, they have many disadvantages. Even when there is employed as an adhesive a homopolymer of nylon 11 or nylon 12, which are considered to have relatively low melting points, low water absorption and excellent durability, a hot melt application temperature of above 200° C is required. Such a high temperature is undesirable because of its possible bad effects on the quality of the objects which are adhered together. Further, if the metal has an untreated surface or a surface cleaned or treated by the conventional cleaning or surface treatment methods employed in industry, such as etching, deoiling, etc., a sufficient lasting adhesive effect cannot be obtained. Accordingly, it is necessary to apply a primer of an epoxy resin, phenol resin or the like before applying the adhesive. This procedure is disadvantageous from the practical viewpoint.

Further, there have been proposed so-called "internally plasticized nylon copolymers" of lower melting points, which are synthesized by copolymerization of 2 or more of caprolactam, lauryl lactam, nylon 6-6 salt and nylon 6-10 salt. Although these nylon copolymers make it possible to bond metals to each other at a relatively low temperature, they also cause an increase in the water absorption and a reduction in the durability of the adhesive bond. There have also been proposed socalled nylon/epoxy film adhesives comprising an internally plasticized polyamide copolymer and epoxy resins, etc. Further, a film of nylon 11 or nylon 12 homopolymer can be coated with an epoxy resin or the like. However, those adhesives are expensive and they have a disadvantage in that a considerable curing time (generally longer than 30 minutes) is required for completing the hardening. Thus, they are unsuitable as a general purpose adhesive for metals.

SUMMARY OF THE INVENTION

We have discovered an adhesive composition for hot melt adhesion at a relatively low temperature, which cures in a short period of time, which has an excellent adhesive power for metals and which has excellent durability. The adhesive composition of the invention consists essentially of (A) from 60 to 90 percent by weight of nylon homopolymers or copolymers of nylon monomers selected from the group consisting of nylon salts having 10 or more carbon atoms, nylon-forming ω-amino acids and nylon-forming lactams, and (B) the balance, i.e., 10 to 40 percent by weight, of ethylene/vinyl acetate copolymer containing 1–25 wt. percent of vinyl acetate.

The term higher nylon salt refers to the conventional class of reaction products of diamines ($H_2N\ R_1NH_2$) with dicarboxylic acids (HOOC R COOH), useful as intermediates in the preparation of nylon polymers, exemplified by the reaction of hexamethylene diamine with adipic acid to form nylon 6-6 salt and the reaction of hexamethylene diamine with sebacic acid to form nylon 6-10 salt. As indicated, the sum of the carbon atoms in $R_1$ plus —CRC— is at least 10. The term ω-amino acid refers to compounds of the formula $H_2NRCOOH$, also a conventional class of materials used in the preparation of nylon polymers, exemplified by ω-aminocaproic acid for nylon 6 and ω-aminoundecanoic acid for nylon 11. The term lactam refers to compounds of the formula

also a conventional class of materials used in the preparation of nylon polymers, exemplified by caprolactam for nylon 6 and lauryl lactam for nylon 12.

It is preferred to employ nylon copolymers of two or more of nylon 6, nylon 11, nylon 12, nylon 6-6 and nylon 6-10 having melting points of less than 150° C. It is especially preferred to employ terpolymers of nylon 12: nylon 6: nylon 6-6, copolymerized in a weight ratio of 25–40 : 25–40 : 25–40 percent by weight, especially about 1:1:1 parts by weight.

The adhesive composition, according to the present invention, can be molded easily into a film with a conventional extruder. It has also been found that, when the adhesive of the present invention is used, a primer treatment of the metal surface is not required because a sufficient adhesion to non-treated metals can be obtained without a primer. The adhesive bond has a long lasting property. It has been found further that when applied to metals which had previously been subjected to various general surface treatments conventionally employed in industrial metal processing plants, such as an acid etching treatment, extremely remarkable effects are obtained, i.e. a uniform adhesion strength and improved, long-lasting property.

Blends of the nylon copolymer with polyethylene resin, ionomer resin or the like were also prepared, but they all had poor miscibilities and film-formation was difficult. Films thus obtained from these comparison compositions were subjected to an adhesion test and this revealed that the adhesion strength was not improved, the heat shrinkage in the lengthwise direction of the films was large and curls were caused during the process of hot melt adhesion thereby giving rise to many problems. Further, although internally plasticized nylon copolymers exhibited an excellent adhesion for metals at a relatively low melt adhesion temperature of below 200° C, their water resistance was poor as shown in the Examples given below.

As for the composition of the ethylene/vinyl acetate copolymer component of the present invention, the miscibility thereof with the above mentioned polyamide copolymer is enhanced and the film formation becomes easier as the amount of vinyl acetate is increased but, on the other hand, the adhesion strength of the resulting adhesive composition for metals is reduced. Therefore, in the preferred compositions in which the formation of films is easy and the desired object can be attained, the vinyl acetate content of the ethylene/vinyl acetate copolymer is 1 to 25 wt. percent, particularly 5 to 20 wt. percent. The amount of the ethylene/vinyl acetate copolymer to be blended with the nylon copolymer is from 10 to 40 wt. percent. If the amount of ethylene/vinyl acetate copolymer is more than 40 wt. percent film-formation is difficult and the adhesion strength for metals is reduced, whereby the desired effect cannot be obtained. If the amount of ethylene/vinyl acetate copolymer is less than 10 wt. percent, no effect of adhesion for metals can be obtained, even though the film formation is easy.

copolymer having a vinyl acetate content of 19 wt. percent and a melt index of 15 (hereinafter referred to as EVA-19), (3) an ethylene/vinyl acetate copolymer having a vinyl acetate content of 28 wt. percent and a melt index of 2 (hereinafter referred to as EVA-282) and (4) an ethylene/vinyl acetate copolymer having a vinyl acetate content of 28 wt. percent and a melt index of 6 (hereinafter referred to as EVA-286). From each of the blends, a film of a thickness of 80$\mu$, was prepared by the T-die method with a conventional extruder. Mild steel plates (0.5 mm thickness), which had previously been subjected to a trichlorethylene deoiling treatment, were bonded together by using the respective adhesive films. The hot melt adhesion was effected between hot plates at 180° C under a pressure of 5 kg/cm$^2$ for 30 seconds. Thereafter, the bonded plates were allowed to stand in a desiccator of 0 percent RH at 20° C for 4 days and then were subjected to a friction pull test according to the specification of ASTM D 1876-61T. The results of the test are shown in Table 1.

Table 1

| | | Results of determination of adhesive strength | | | | |
|---|---|---|---|---|---|---|
| | Nylon 12 copolymer | Ethylene/vinyl acetate copolymer (parts by weight) | | | | Adhesive strength |
| No. | (parts by weight) | EVA-7 | EVA-19 | EVA-282 | EVA-286 | (kg/25 mm) |
| 1* | 100 | — | — | — | — | 10.5 ± 1.5 |
| 2 | 80 | 20 | — | — | — | 15.6 ± 1.0 |
| 3 | 80 | — | 20 | — | — | 13.7 ± 1.0 |
| 4* | 80 | — | — | 20 | — | 8.0 ± 2.5 |
| 5* | 80 | — | — | — | 20 | 5.4 ± 1.5 |
| 6* | 20 | 80 | — | — | — | 7.5 ± 1.5 |
| 7* | 20 | — | — | 80 | — | 6.5 ± 1.0 |
| 8* | — | 100 | — | — | — | 6.1 ± 1.0 |
| 9* | — | — | 100 | — | — | 6.0 ± 1.0 |
| 10* | — | — | — | 100 | — | 5.2 ± 1.5 |
| 11* | — | — | — | — | 100 | 5.1 ± 1.0 |

*Comparative example
Number of samples = 10

The temperatures, pressures and times of the bonding step are those which are sufficient to effect the bonding of the metal surfaces through the film of adhesive material. Ordinarily pressures in the range of 5 to 10 kg/cm$^2$, temperatures in the range of 120° to 180° C, and pressing times in the range of 0.5 to 30 minutes give satisfactory results.

DETAILED DESCRIPTION OF THE INVENTION

The effects of the present invention will be further described by reference to the following illustrative examples.

EXAMPLE 1

Samples of 80 parts of a polyamide copolymer (melting point: 115° C, relative viscosity: 1.71, melt index: 8.5; hereinafter referred to as nylon 12 copolymer) synthesized from 33 parts of lauryllactam, 33 parts of caprolactam and 33 parts of nylon 6-6 salt, were blended respectively with 20 parts of (1) an ethylene/vinyl acetate copolymer having a vinyl acetate content of 7 wt. percent and a melt index of 2 (hereinafter referred to as EVA-7), (2) an ethylene/vinyl acetate From the results shown in Table 1, it is apparent that, as compared with the cases wherein nylon 12 copolymer and the various ethylene/vinyl acetate copolymers are used alone, the compositions comprising a blend of 80 parts of nylon 12 copolymer and 20 parts of EVA-7 or EVA-19 had a far more excellent effect for the adhesion of metals. It is also apparent that a blend comprising nylon 12 copolymer and EVA-282 or EVA-286 has a lower adhesive strength than that of nylon 12 copolymer alone.

EXAMPLE 2

The same adhesion test as described in Example 1 was carried out except that the amount of ethylene/vinyl acetate copolymer blended with the nylon 12 copolymer in the respective adhesive compositions was varied.

As the metal objects to be adhered, there were employed mild steel plates (0.5 mm thickness) which had been subjected to a trichloroethylene deoiling treatment. The thickness of the film used for the adhesion was 80$\mu$ as in Example 1. The results of the adhesion tests are shown in Table 2.

Table 2

| | | Blending ratio and adhesive strength | | |
|---|---|---|---|---|
| | Nylon 12 copolymer | Ethylene/vinyl acetate copolymer (parts by weight) | | Adhesive strength |
| No. | (parts by weight) | EVA-7 | EVA-282 | (kg/25 mm) |
| 12* | 100 | — | — | 10.5 ± 1.5 |

Table 2-continued

| No. | Nylon 12 copolymer (parts by weight) | Blending ratio and adhesive strength | | Adhesive strength (kg/25 mm) |
|---|---|---|---|---|
| | | Ethylene/vinyl acetate copolymer (parts by weight) | | |
| | | EVA-7 | EVA-282 | |
| 13 | 90 | 10 | — | 12.0 ± 1.5 |
| 14 | 80 | 20 | — | 16.0 ± 1.5 |
| 15 | 70 | 30 | — | 15.0 ± 1.5 |
| 16 | 60 | 40 | — | 9.0 ± 1.0 |
| 17* | 90 | — | 10 | 8.5 ± 1.0 |
| 18* | 80 | — | 20 | 7.8 ± 1.5 |
| 19* | 70 | — | 30 | 6.0 ± 1.0 |
| 20* | 60 | — | 40 | 5.6 ± 1.5 |

*comparative examples
Number of samples = 10

From the results shown in Table 2, it is apparent that as the ethylene/vinyl acetate copolymer to be blended with the nylon 12 copolymer, EVA-7 is highly effective for the adhesion of metals and that the optimum amount thereof is 10 to 30 parts.

EXAMPLE 3

The adhesive strengths, for various metals the surface of which had been treated in various manners, of a film (80μ) of nylon 12 copolymer as used in Example 1, a film (80μ; hereinafter referred to as FE-1) prepared from a blend of 80 parts of nylon 12 copolymer and 20 parts of EVA-7, a film (80μ; hereinafter referred to as FE-2) prepared from a blend of 80 parts of a nylon 12 copolymer and 20 parts of EVA-282 and a film (hereinafter referred to as Sarlin A) prepared from an ionomer resin (1601, a product of Mitsui Polychemical Co.) were examined. The results are shown in Table 3.

The method and conditions of the adhesion test were the same as those in Example 1.

Table 3

| Metal | Method of surface treatment | Adhesive properties for metals treated by various methods | | | |
|---|---|---|---|---|---|
| | | Nylon 12 copolymer* | FE-1 | FE-2* | A* |
| Mild steel plate | Untreated | 10.0 ± 1.5 | 14.0 ± 1.0 | 8.0 ± 1.5 | 6.0 ± 1.5 |
| | Sulfuric acid etch | 12.0 ± 1.0 | 16.0 ± 1.5 | 9.5 ± 1.0 | 8.0 ± 1.5 |
| | Bonde treatment | 12.5 ± 1.0 | 22.0 ± 1.5 | 10.5 ± 1.5 | 8.5 ± 1.0 |
| Stainless steel | Untreated | 9.0 ± 1.5 | 15.0 ± 1.5 | 7.5   1.5 | 5.7 ± 1.0 |
| | Sulfuric acid etch | 10.5 ± 1.5 | 16.5 ± 1.0 | 9.0 ± 1.5 | 6.2 ± 1.0 |
| T.F.S. (tin free steel) | Untreated | 13.0 ± 1.0 | 15.5 ± 1.5 | 8.5 ± 1.0 | 5.8 ± 1.5 |
| Aluminum | Washed with soda | 8.0 ± 1.5 | 12.5 ± 1.5 | 7.0 ± 1.5 | 7.0 ± 1.5 |
| | Chromic acid formation surface treatment | 12.0 ± 1.5 | 16.5 ± 1.0 | 10.5 ± 1.0 | 8.0 ± 1.0 |
| | Bonde treatment | 13.5 ± 1.0 | 18.5 ± 1.5 | 11.5 ± 1.5 | 8.0 + 1.5 |
| Galvanized sheet iron | Untreated | 9.0 ± 1.5 | 13.0 ± 1.0 | 6.5 ± 1.0 | 5.1 ± 1.5 |
| | Bonde treatment | 13.0 ± 1.5 | 18.0 ± 1.0 | 9.5 ± 1.5 | 7.5 ± 1.0 |
| Copper | Untreated | 8.5 ± 1.5 | 11.5 ± 1.5 | 7.5 ± 1.0 | 3.5 ± 1.0 |

*Comparative examples
Number of samples = 10

From the results shown in Table 3, it is apparent that FE-1 exhibits an excellent adhesive power for various metals, and that this effect is particularly remarkable for metals which had been subjected to the Bonde treatment.

EXAMPLE 4

Hot melt adhesion of different kinds of metal plates which had been subjected to various surface treatments was effected in the same manner as in Example 3 by using films of nylon 12 copolymer (80μ), FE-1 (80μ), FE-2 (80μ) and Sarlin A (100μ) as used in Example 3. The results of the various durability tests of the products are shown in Table 4.

Method of the test and conditions of the adhesion test were the same as in Example 1.

Table 4

| Metal | Method of surface treatment | Film | Result of durability tests | | | |
|---|---|---|---|---|---|---|
| | | | Adhesive strength (kg/25 mm) | | | |
| | | | Normal conditions | Water resistance test (see Note *1) | Thermal resistance test (see Note *2) | Repeated cold-heat treatment test (see Note *3) |
| | Untreated | Nylon 12 copolymer* | 9.0 ± 1.5 | 3.5 ± 1.5 | 6.5 ± 1.5 | 6.0 ± 1.5 |
| | | FE-1 | 15.5 ± 1.5 | 12.5 ± 1.5 | 18.0 ± 2.0 | 17.5 ± 1.5 |

Table 4-continued

Result of durability tests

| Metal | Method of surface treatment | Film | Adhesive strength (kg/25 mm) Normal conditions | Water resistance test (see Note *1) | Thermal resistance test (see Note *2) | Repeated cold-heat treatment test (see Note *3) |
|---|---|---|---|---|---|---|
| Stainless steel | Acid-etching | FE-2* | 7.5 ± 1.5 | 2.5 ± 1.0 | 5.5 ± 1.0 | 4.5 ± 1.5 |
| | | Sarlin A* | 5.7 ± 1.5 | 2.5 ± 1.5 | 4.5 ± 1.5 | 3.0 ± 1.5 |
| | | Nylon 12 copolymer* | 10.5 ± 1.0 | 3.5 ± 1.5 | 8.5 ± 1.5 | 6.0 ± 1.5 |
| | | FE-1 | 16.5 ± 1.0 | 14.0 ± 1.5 | 19.5 ± 1.0 | 18.0 ± 1.5 |
| | Untreated | FE-2* | 9.0 ± 1.5 | 3.0 ± 1.5 | 10.5 ± 1.5 | 5.5 ± 1.5 |
| | | Sarlin A* | 6.2 ± 1.0 | 3.0 ± 1.5 | 5.5 ± 1.0 | 3.0 ± 1.0 |
| | | Nylon 12 copolymer* | 10.0 ± 1.5 | 3.5 ± 1.0 | 9.5 ± 1.5 | 7.5 ± 1.0 |
| | | FE-1 | 14.0 ± 1.0 | 12.5 ± 1.5 | 17.5 ± 1.5 | 10.0 ± 1.5 |
| mild steel plate | Bonde treatment | FE-2* | 9.5 ± 1.0 | 3.0 ± 1.5 | 7.5 + 1.5 | 5.5 ± 1.0 |
| | | Sarlin A* | 6.0 ± 1.5 | 3.0 ± 1.0 | 4.5 ± 1.0 | 3.5 ± 1.0 |
| | | Nylon 12 copolymer* | 12.5 ± 1.0 | 5.0 ± 1.5 | 12.0 ± 1.5 | 10.5 ± 1.5 |
| | | FE-1 | 22.0 ± 1.5 | 16.5 ± 1.0 | 21.5 ± 1.5 | 18.5 ± 1.5 |
| | Washed with soda | FE-2* | 10.5 ± 1.5 | 3.0 ± 1.0 | 11.0 ± 1.5 | 7.5 ± 1.5 |
| | | Sarlin A* | 8.5 ± 1.0 | 3.0 ± 1.5 | 6.0 ± 1.5 | 4.0 ± 1.5 |
| | | Nylon 12 copolymer* | 8.0 ± 1.5 | 2.5 ± 1.0 | 5.8 ± 1.0 | 5.0 ± 1.5 |
| | | FE-1 | 12.5 ± 1.5 | 9.5 ± 1.5 | 11.0 ± 1.5 | 11.5 ± 1.0 |
| Aluminum | Chromate treatment | FE-2* | 7.0 ± 1.5 | 2.5 ± 1.5 | 4.0 ± 1.0 | 3.5 ± 1.0 |
| | | Sarlin A* | 7.0 ± 1.5 | 2.5 ± 1.5 | 4.5 ± 1.5 | 3.0 ± 1.5 |
| | | Nylon 12 copolymer* | 12.0 ± 1.5 | 7.0 ± 1.5 | 11.0 ± 1.5 | 8.0 ± 1.5 |
| | | FE-1 | 16.5 ± 1.0 | 12.0 ± 1.0 | 18.0 ± 1.5 | 17.5 ± 1.0 |
| | Bonde treatment | FE-2* | 10.5 ± 1.0 | 4.0 ± 1.0 | 7.0 ± 1.0 | 7.5 ± 1.0 |
| | | Sarlin A* | 8.0 ± 1.0 | 4.0 ± 1.5 | 6.0 ± 1.5 | 4.5 ± 1.5 |
| | | Nylon 12 copolymer* | 15.0 ± 1.0 | 8.0 ± 1.5 | 11.0 ± 1.5 | 11.0 ± 1.5 |
| | | FE-1 | 18.5 ± 1.5 | 15.5 ± 1.0 | 19.5 ± 1.0 | 20.5 ± 1.5 |
| Aluminum | Untreated | FE-2* | 11.5 ± 1.5 | 5.0 ± 1.0 | 7.5 ± 1.0 | 6.5 ± 1.0 |
| | | Sarlin A* | 8.0 ± 1.5 | 5.0 ± 1.5 | 7.0 ± 1.5 | 7.0 ± 1.0 |
| | | Nylon 12 copolymer* | 13.0 ± 1.5 | 6.0 ± 1.5 | 11.0 ± 1.5 | 9.0 ± 1.5 |
| T.F.S. | | FE-1 | 15.5 ± 1.5 | 11.5 ± 1.0 | 17.5 ± 1.5 | 10.5 ± 1.5 |
| | | FE-2* | 8.5 ± 1.0 | 4.0 ± 1.5 | 6.0 ± 1.5 | 6.0 ± 1.5 |
| | | Sarlin A* | 5.8 ± 1.5 | 2.5 ± 1.0 | 4.0 ± 1.5 | 4.0 ± 1.5 |

Notes:
*1. Adhesive power was examined after immersing the bonded product in running city water at 25° C for one week.
*2. Adhesive power was examined after allowing the bonded product to stand in a hot air circulation oven at 80° C for one week.
*3. The bonded product was allowed to stand in an oven at 80° C for one hour and then in a refrigerator at −30° C for one hour. This cycle was repeated 10 times and the adhesion strength of the product was then examined.

From the results shown in Table 4, it is apparent that, as compared with the nylon copolymer, FE-2 and Sarlin A, FE-1 has a far more excellent adhesion durability for metals which had been subjected to various surface treatments. This is remarkable in the most excellent retention rate due to its water resistance.

The embodiments of the invention in which an exclusive property or privilege is claimed are defined as follows:

1. A thermoplastic hot melt adhesive composition for bonding metals which consists essentially of a homogeneous mixture obtained by admixing and blending (A) 60 to 90 percent by weight of a copolymer of nylon 12; nylon 6; nylon 6-6, copolymerized in a weight ratio of 25–40; 25–40; 25–40, and (B) the balance is an ethylene/vinyl acetate copolymer containing 5 to 20 weight percent of vinyl acetate.

2. An extruded film or web consisting of the thermoplastic hot melt adhesive composition according to claim 1.

* * * * *